May 22, 1928.
L. G. GALLOWAY
CONDIMENT HOLDER
Filed Jan. 29, 1927
1,670,616
2 Sheets-Sheet 1
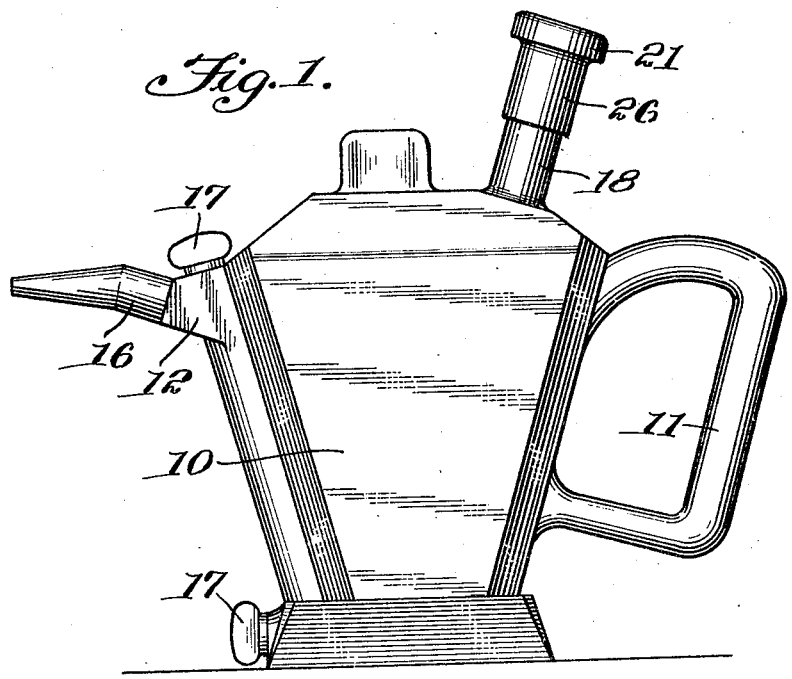
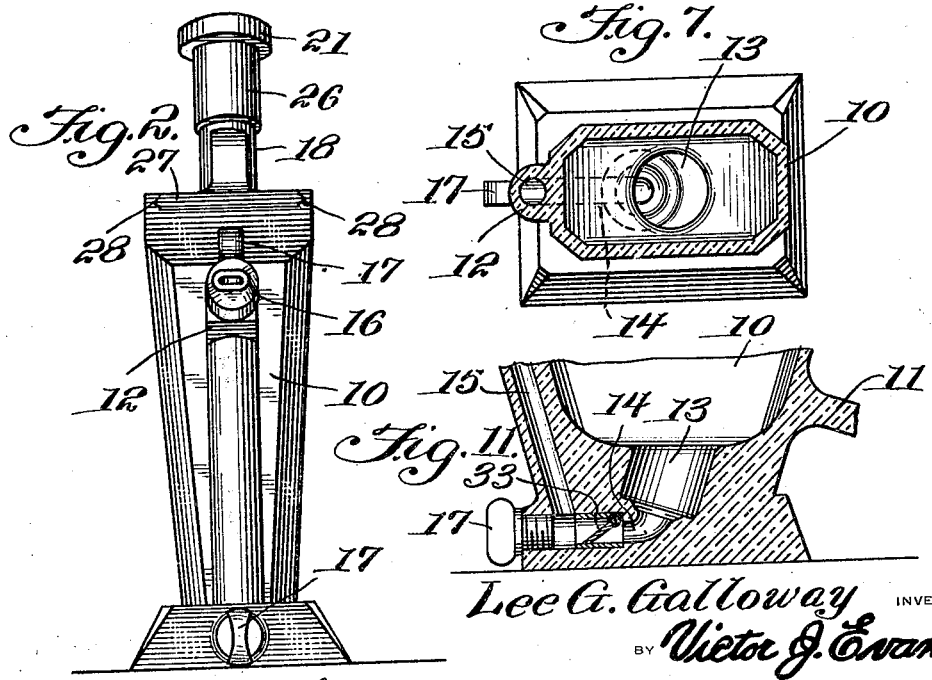
Lee G. Galloway INVENTOR
BY Victor J. Evans ATTORNEY
WITNESS: J. L. Wright

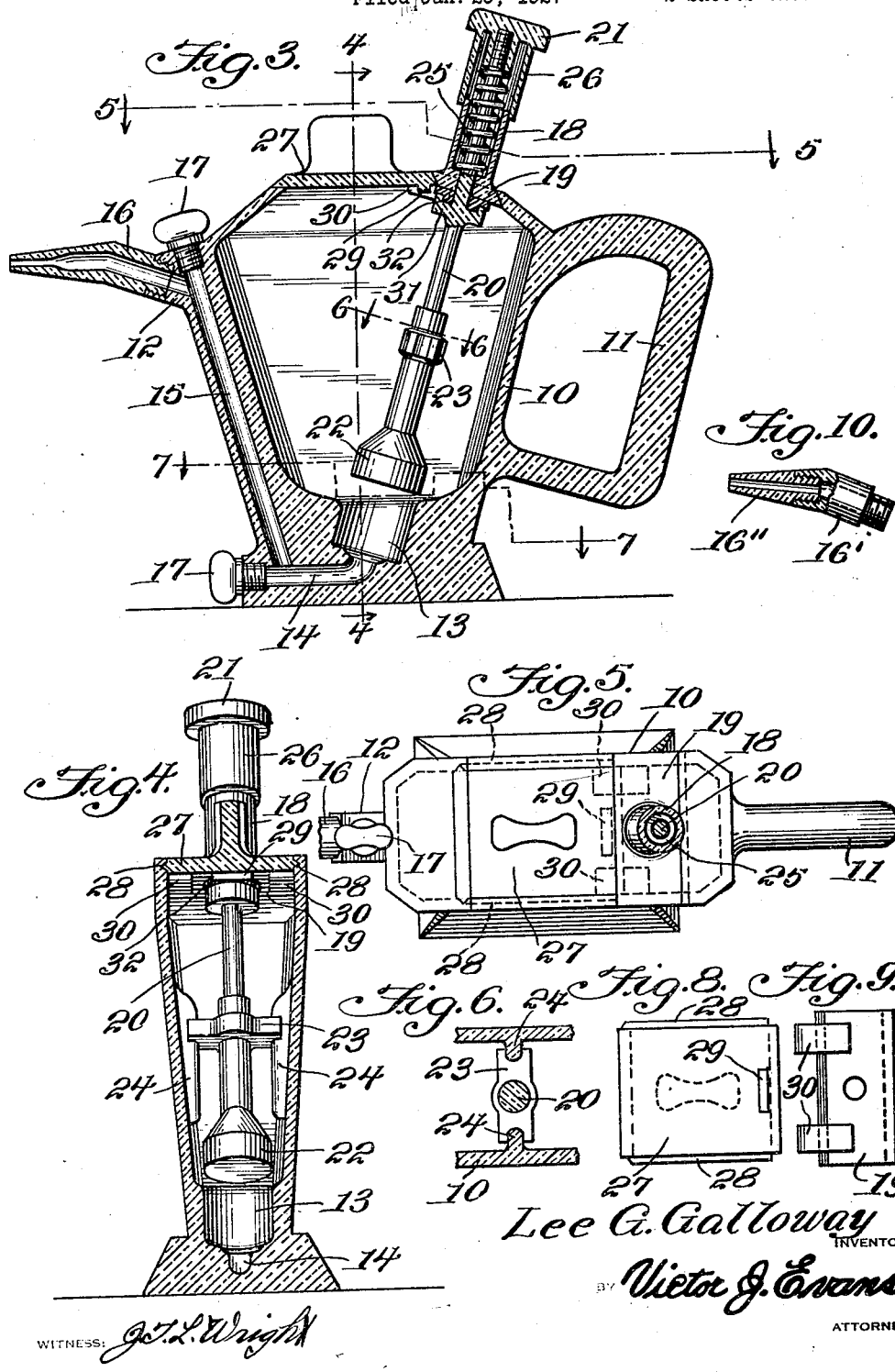

Patented May 22, 1928.

1,670,616

UNITED STATES PATENT OFFICE.

LEE GRADY GALLOWAY, OF ROSMAN, NORTH CAROLINA.

CONDIMENT HOLDER.

Application filed January 29, 1927. Serial No. 164,568.

This invention relates to a container for liquids and semi-liquids, such as the various commodities used at meals, including syrup, milk, etc., the general object of the invention being to provide means for positively ejecting the contents of a container therefrom, thus rendering it unnecessary to have a pouring opening in the container, which is objectionable as it permits insects, dust, etc. to reach the contents, and the invention also permits the contents to be discharged without tilting the holder or container.

A further object of the invention is to make the various passages and interior parts accessible so that they can be readily cleaned and repaired when necessary.

A still further object of the invention is to provide a well in the bottom of the container and to make the ejecting device in the form of a plunger, the head of which is adapted to enter the well to force the material therein through passages formed in the body of the container to a spout or nozzle.

Another object of the invention is to provide valve means for preventing the liquid in the passages from returning to the well on the back stroke of the plunger head.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of a device constructed in accordance with this invention.

Figure 2 is a front view thereof.

Figure 3 is a vertical sectional view through the device.

Figure 4 is a section on line 4—4 of Figure 3.

Figure 5 is a section on line 5—5 of Figure 3.

Figure 6 is a section on the line 6—6 of Figure 3.

Figure 7 is a section on line 7—7 of Figure 3.

Figure 8 is a bottom plan view of the sliding lid.

Figure 9 is a bottom plan view of the plate which carries the plunger.

Figure 10 is a sectional detail view showing an interchangeable form of nozzle or spout.

Figure 11 is a detail view showing the use of a check valve in the outlet passages of the device.

In these views, 10 indicates the body of the holder or container which in this instance is made somewhat in the form of a pitcher and is adapted for use upon a table, though it will, of course, be understood that the device can be used for any purpose, can be made of any shape and of any suitable material.

The body is provided with a handle 11 and a discharge spout 12 and it is formed with a well 13 in its bottom and with passages 14 and 15 which connect the bottom of the well with the part 12. A nozzle or spout 16 is threaded in the part 12. The outer ends of the passages are threaded to receive the threaded ends of plugs 17 so that the passages can be cleaned by removing the plugs.

A boss 18 is carried by a plate 19 which acts to close a part of the open top of the container and the shank 20 of a plunger passes through a hole in the plate and through the boss, with its outer end having a knob 21 screwed thereto, with the head 22 of the plunger adapted to enter the well to eject some of the contents of the container in the well through the passages and through the spout when the plunger is reciprocated. The plunger is guided in its movement so as to enter the well by means of a cross head 23 on the shank of the plunger and having slots in its ends for engaging the guiding ribs 24 on the interior walls of the container. A spring 25 is placed in the boss 18 and surrounds the outer end of the stem and bears against an inner part of the knob 21, this spring acting to hold the plunger retracted or in raised position. A sleeve 26, formed on the knob, slides over the boss 18 and this sleeve and boss enclose the spring.

A lid 27 covers the opening in the top of the receptacle and has its beveled edges sliding in the guideways 28 in the walls of the opening. A depending projection 29 on the inner end of the lid prevents the lid from being entirely removed from the receptacle. The plate 19 has both side edges beveled to engage a beveled edge of one wall of the opening in the top of the receptacle and the beveled inner edge of the lid 27. Lips 30 are also formed on the plate 19 which are engaged by the lid when the same is closed so as to hold the plate 19 in position.

A recessed collar 31 is connected with the stem of the plunger and a gasket 32 is placed in the recess thereof to engage the bottom portion of the plate 19 when the plunger is in raised position to prevent leakage around the stem where it passes through the plate.

Figure 10 shows a nozzle 16' formed in two parts so that the discharge part 16" can be removed and one of another shape substituted therefor so that the receptacle can be used for dispensing different kinds of liquids or semi-liquids.

From the foregoing it will be seen that by reciprocating the plunger, a pumping action is set up which will force the material from the well through the passages 14 and 15 and eject it from the nozzle. Thus it is not necessary to provide the receptacle with a pouring spout and its contents are kept in a sanitary condition as there is no chance of dirt, insects and the like entering the receptacle. Whenever desired, the parts can be easily and quickly cleaned by removing the working parts and the plugs 17.

It will be seen that by moving the slide, the plate 19 and the plunger parts can be removed and then the slide can be separated from the receptacle by moving it toward the rear of the receptacle so that the stop 29 will pass over the rear wall of the opening in the top of the receptacle.

When desired, a check valve 33 can be placed in the passage 14 so as to prevent the material in the passages from returning to the receptacle as the plunger is withdrawn from the well.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

A container of the class described comprising a body having a well in its bottom and passages connected with the well, a discharge spout connected with the body with which the passages connect, removable plugs for closing the outer ends of the passages, the top of the container being open, a sliding lid for closing the same, a plate covering portion of the opening, a plunger having its stem passing through the plate with its head adapted to enter the well, a cross head on the stem having notches therein, guiding ribs on the internal walls of the container receiving the notches for guiding the plunger in its movements, a finger engaging part on the outer end of the stem, spring means for holding the plunger in raised position and a gasket carried by the stem for preventing leakage around the stem when the plunger is in raised position.

In testimony whereof I affix my signature.

LEE GRADY GALLOWAY.